United States Patent
Marx et al.

(10) Patent No.: US 12,479,409 B2
(45) Date of Patent: Nov. 25, 2025

(54) METHOD FOR OPERATING A FORCE-SENSOR-LESS ELECTROMECHANICAL SERVICE BRAKE OF A VEHICLE

(71) Applicant: ZF Active Safety GmbH, Koblenz (DE)

(72) Inventors: Andreas Marx, Hartenfels (DE); Fabian Querbach, Lonnig (DE)

(73) Assignee: ZF Active Safety GmbH, Koblenz (DE)

( * ) Notice: Subject to any disclaimer, the term of this patent is extended or adjusted under 35 U.S.C. 154(b) by 122 days.

(21) Appl. No.: 18/465,276

(22) Filed: Sep. 12, 2023

(65) Prior Publication Data
US 2024/0083404 A1    Mar. 14, 2024

(30) Foreign Application Priority Data
Sep. 12, 2022  (DE) .......................... 102022123151.8

(51) Int. Cl.
*B60T 13/74*    (2006.01)

(52) U.S. Cl.
CPC .......... *B60T 13/741* (2013.01); *B60T 13/746* (2013.01)

(58) Field of Classification Search
CPC ...... B60T 13/741; B60T 13/746; B60T 8/172; B60T 8/174; B60T 13/74
See application file for complete search history.

(56) References Cited

U.S. PATENT DOCUMENTS

| | | | |
|---|---|---|---|
| 11,919,493 B2 * | 3/2024 | Uraoka | B60T 13/741 |
| 2023/0126047 A1 * | 4/2023 | Kojima | H02P 29/60 |
| | | | 318/473 |

FOREIGN PATENT DOCUMENTS

| | | |
|---|---|---|
| DE | 19703838 A1 | 8/1998 |
| DE | 10361042 B3 | 5/2005 |

* cited by examiner

*Primary Examiner* — Lindsay M Low
*Assistant Examiner* — Ruben Picon-Feliciano
(74) *Attorney, Agent, or Firm* — Kristin L. Murphy

(57) ABSTRACT

In a method for operating a force-sensor-less electromechanical service brake of a vehicle, a current profile of a force-displacement characteristic is determined and stored during a closing of a parking brake when the vehicle is being parked. The current profile of the force-displacement characteristic is used during a subsequent trip to set a required braking force on the electromechanical service brake.

11 Claims, 2 Drawing Sheets

METHOD FOR OPERATING A FORCE-SENSOR-LESS ELECTROMECHANICAL SERVICE BRAKE OF A VEHICLE

CROSS-REFERENCE TO RELATED APPLICATION

This application claims priority to German Priority Application No. 102022123151.8, filed Sep. 12, 2022, the disclosure of which is incorporated herein by reference in its entirety.

TECHNICAL FIELD

The disclosure relates to a method for operating a force-sensor-less electromechanical service brake of a vehicle and to a brake system.

BACKGROUND

In the case of an electromechanical brake, in contrast to conventional hydraulically actuated brakes, an element moved by an electric motor, for example a ball screw, is provided, which acts on movable friction elements of the brake in order to close the brake. The force supplied by the electric motor is converted into a movement of the friction elements of the brake with respect to one another. For example, a brake pad is pressed against a brake disk and in this way the brake pressure required to close the brake is generated.

Electromechanical brakes can be used both as a parking brake and as a service brake. In contrast to the parking brake that secures the parked vehicle, the service brake is used to bring about a temporary vehicle deceleration while driving.

There is a desire to know the brake pressure or the braking force generated by the electric motor during the actuation of the brake. Since, owing to wear, but also owing to the effect of temperature during driving, among other factors, the necessary actuation travel of the brake changes over time, regular detection is necessary. For this purpose, it is customary to use force sensors. However, their use is space-consuming and expensive.

SUMMARY

What is needed is to make the operation of a brake system simple, safe and inexpensive despite the use of force-sensor-less electromechanical service brakes.

A method for operating a force-sensor-less electromechanical service brake of a vehicle is disclosed, in which a current profile of a force-displacement characteristic of the force-sensor-less electromechanical service brake is determined and stored during the closing of a parking brake when the vehicle is being parked and wherein the current profile of the force-displacement characteristic is used during a subsequent trip to set a required braking force on the electromechanical service brake to fulfil a braking request.

In this way, it is possible to reliably carry out a braking process to fulfil a braking request even without a force sensor.

The force-displacement characteristic determined in this way may be used for the entire trip, until the vehicle is parked and the parking brake is closed again.

In one exemplary arrangement, the determination of the current profile of the force-displacement characteristic takes place each time the vehicle is parked, the parking brake being actuated during this parking operation. It would be conceivable to also carry out a measurement when the parking brake is closed during a trip.

In principle, the aim is to avoid actuation of the electromechanical service brakes outside of a current braking process.

The parking brake can be one of the force-sensor-less electromechanical service brakes of the vehicle, which force-sensor-less electromechanical service brake comprises a locking mechanism. In this case, the electromechanical service brake is also used as a parking brake. In order to close the parking brake, the electromechanical service brake is completely closed and then the locking mechanism is activated and the electric motor is switched off.

In a first exemplary variant, the current profile of the respective force-displacement characteristic of the individual brakes is determined on all the force-sensor-less electromechanical service brakes of the vehicle during the closing of the parking brake. Once the measurement is complete, the electric motors of all the force-sensor-less electromechanical service brakes are switched off again.

If only the electromechanical service brakes on one axle of the vehicle are designed as parking brakes, for example those of the rear axle of the vehicle, in another exemplary variant determination of the current profile of the force-displacement characteristic is carried out only for the electromechanical service brakes configured as parking brakes. The force-displacement characteristics of the other electromechanical service brakes, e.g. on the front axle, are determined from the determined force-displacement characteristic. For this purpose, a conclusion can be drawn about the force-displacement characteristics of the other electromechanical service brakes by suitable calculations from the measured force-displacement characteristic, for example.

The total rotation angle of the shaft of the electric motor is, as a good approximation, directly proportional to the relative movement of the friction elements of the electromechanical service brake. For example, the total rotation angle of the shaft of the electric motor is proportional to the total rotation angle of a spindle of a ball screw that moves an actuating piston which acts on the friction elements of the electromechanical service brake in order to close this brake. The shaft of the electric motor and the components in the force transmission path between the shaft and the friction elements of the electromechanical service brake are advantageously designed to be so rigid, being made of metal for example, that no significant deformation occurs at these components when the shaft of the electric motor is rotated. Thus, the position of the friction elements can be unambiguously determined via the total rotation angle of the shaft of the electric motor. There is therefore no need for any other way of measuring the displacement.

It has been found that, if the force-displacement characteristic has a sufficient resolution, the braking requests initiated by the vehicle driver or autonomous systems of the vehicle can be satisfied even without directly measuring the force during the actuation of the electromechanical service brake. For this purpose, the force-displacement characteristic is measured with a resolution which is sufficient for all common actuating forces in the brake and thus all common relative positions of the friction elements of the brake. In principle, significantly more than two measuring points are used for this purpose.

The activation of the brake thus takes place essentially through knowledge of the relationship between the total rotation angle of the shaft of the electric motor and the braking force at the position of the friction elements of the brake which is determined thereby.

For example, for determination of the current profile of the force-displacement characteristic, an electric motor of the service brake is activated with a steadily increasing current and a total rotation angle of a shaft of the electric motor is detected, resulting in a time profile of the total rotation angle, from which the displacement-force characteristic is determined. The increase in operating current should be so slow that no dynamic changes occur as far as possible. In one exemplary arrangement, the current flow is unregulated in order to prevent unsteadiness due to feedback control. The force-displacement characteristic is determined from the known electric current values and the displacement determined via the total rotation angle of the shaft of the electric motor.

It is a simple matter to generate a force-displacement characteristic of the electromechanical service brake from these data, for example by calculation, simulation or simultaneous measurement of the total rotation angle $\alpha$ and the braking force F in advance. In general, the energy supply is also known from a specification of the operating current of the electric motor. In all cases, it is possible, on the basis of these known variables, to determine the current profile of the force-displacement characteristic of the electromechanical service brake by measuring the time profile of the total rotation angle.

There is no need for feedback control during the closing of the parking brake. Moreover, there is sufficient time available during this process to traverse and determine the force-displacement characteristic.

Moreover, a basic zero value of the brake is recorded at the workshop and stored as a reference value. From this reference value, the force-displacement characteristic can be determined. This reference value can be determined, for example, by the electric motor carrying out a reference run onto a rear stop of the electromechanical service brake outside normal driving operation.

BRIEF DESCRIPTION OF DRAWINGS

The disclosure will be described in more detail below as an exemplary arrangement with reference to the attached figures. In the figures.

DETAILED DESCRIPTION

Figure 1:
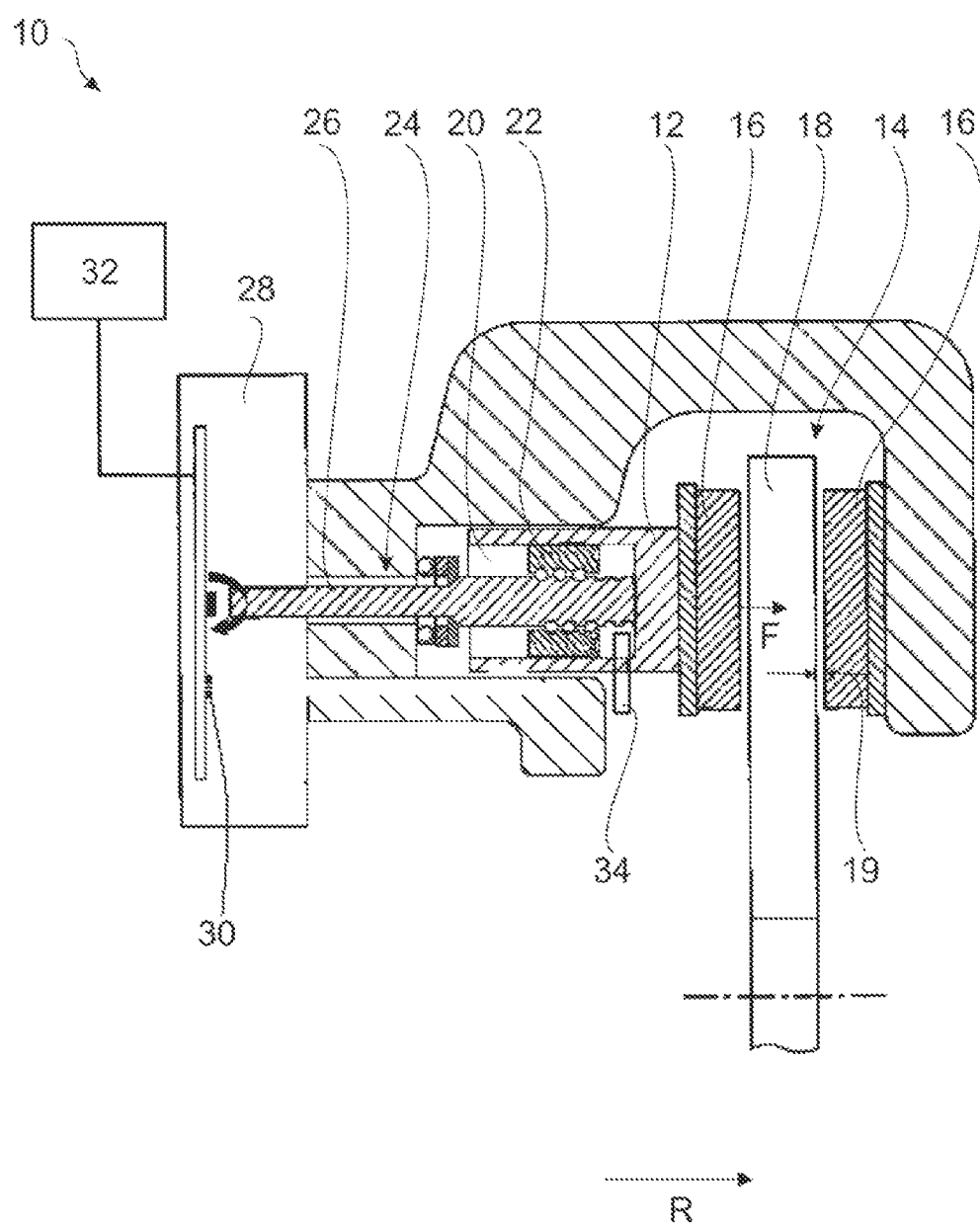
FIG. 1 shows a schematic illustration of a force-sensor-less electromechanical service brake, which can be used in the method according to the disclosure and in the brake system according to the disclosure.

FIG. 1 shows, by way of example, a force-sensor-less electromechanical service brake 10 of a vehicle 11, which comprises an actuating piston 12, which acts on a brake assembly 14 and transmits a braking force F to the latter.

The brake assembly 14 comprises interacting friction elements. In the example shown here, the brake assembly 14 is a known floating calliper brake with two brake pads 16 and a brake disc 18 arranged therebetween as friction elements. In the unactuated state, the brake pads 16 are spaced apart from the brake disc 18 by a release clearance 19. This can be about 0.3 mm, for example.

A recirculating ball nut 22 of a ball screw 24 is accommodated in an internal cavity 20 of the actuating piston 12. A spindle 26 of the ball screw 24 is coupled to an electric motor 28, the shaft of which can set the spindle 26 in rotation, moving the ball nut 22 linearly along the spindle 26.

The recirculating ball nut 22 moves the actuating piston 12 in the direction R towards the brake assembly 14, here in the direction of one of the brake pads 16.

A detection element 30 is arranged in the region of the electric motor 28 in such a way that it can measure a rotation rate of the shaft of the electric motor 28. Here, the detection element 30 is furthermore designed in such a way that it detects a total rotation angle $\alpha$ of the shaft, which is directly proportional to a total rotation angle of the spindle 26. In this case, the total rotation angle $\alpha$ is considered in each case starting from a known zero point.

The determined values are transferred to a control unit 32, processed and, if appropriate, stored. The control unit 32 communicates in a suitable manner with other components of a brake system 43 as well as with other systems in the vehicle.

In the exemplary arrangement shown here, the electromechanical service brake 10 comprises a locking mechanism 34, which is designed in such a way that it can hold the brake assembly 14 in a closed position without the electric motor 28 having to be supplied with current. In this way, the electromechanical service brake 10 can also be used as a parking brake when the vehicle 11 is parked at the end of the trip. During normal driving operation, the locking mechanism 34 is fully released.

The total rotation angle $\alpha$ is a directly measurable parameter which provides an unambiguous relationship between the rotation of the shaft of the electric motor 28 and the position of the actuating piston 12.

In the service brake 10 shown here, all components in the force transmission path are connected to one another in a sufficiently rigid way and without significant play. They consist of metal, for example. There is therefore an unambiguous proportional relationship between the total rotation angle $\alpha$ of the shaft of the electric motor 28 and the position of the actuating piston 12. The position of the actuating piston 12 is reproducible and can be determined without hysteresis effects. Since the position of the actuating piston 12 is directly related to the braking force F, the total rotation angle $\alpha$ can be used as a direct measure of the actuating force F of the electromechanical service brake 10 (see FIG. 2).

Figure 2:
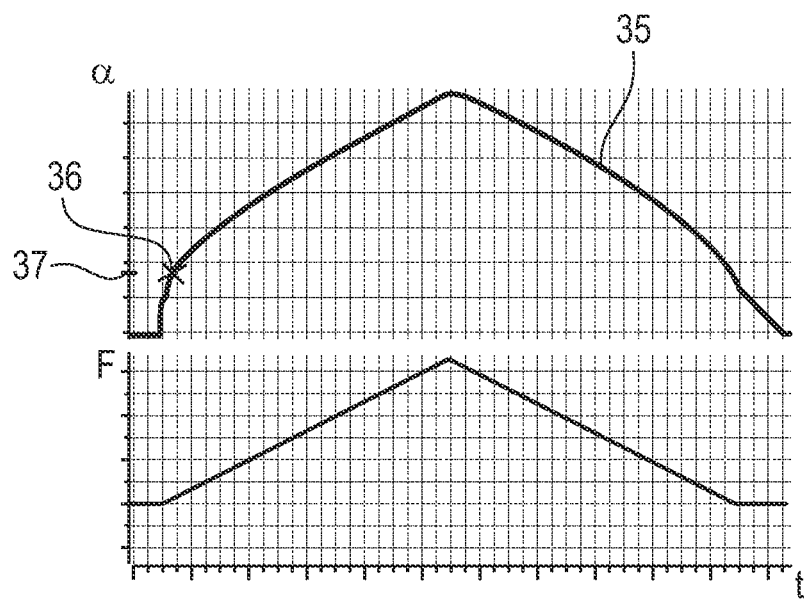
FIG. 2 shows a schematic illustration of the relationship between the braking force and the total rotation angle.

FIG. 2 shows the relationship between the total rotation angle $\alpha$ and the braking force F in a simultaneously measured time profile. The time profile 35 of the total rotation angle $\alpha$ of the shaft of the electric motor 28 is shown together with the associated time profile of the braking force F of the electromechanical service brake 10.

It is a simple matter to generate a force-displacement characteristic (not shown) of the electromechanical service brake 10 from these data, for example by calculation, simulation or simultaneous measurement of the total rotation angle $\alpha$ and the braking force F in advance. In general, the energy supply is also known from a specification of the operating current of the electric motor 28. In all cases, it is possible, on the basis of these known variables, to determine a current force-displacement characteristic of the electromechanical service brake 10 by measuring the time profile of the total rotation angle $\alpha$.

FIG. 2 also clearly shows a kink in the curve of the time profile 35, which coincides with the increase in the braking force F. This kink identifies a braking contact point 36 (also called a touch disc point). The braking contact point 36 denotes a contact point of the friction elements of the electromechanical service brake 10, from which the release clearance 19 is overcome and a significant friction effect occurs. When this braking contact point 36 is reached, the brake begins to close and build up the braking force F.

The displacement point 37 at this total rotation angle indicates the position for setting the release clearance 19. In addition, it also represents the current zero point of the force-displacement characteristic.

In order to determine the braking contact point 36, the actuating piston 12 is moved from a known reference point in the direction of the brake assembly 14 by the rotation of the shaft of the electric motor 28. A constant, unregulated current is applied to the electric motor 28. Until the release clearance 19 has been overcome, the shaft rotates at a high rotation rate since the electric motor 28 does not have to overcome any significant mechanical resistance. However, from the braking contact point 36, this resistance rises, leading to a reduction in the rotation rate from the displacement point 37. This drop in the rotation rate is measured by the detection element 30.

For determination of the braking contact point 36, the electromechanical service brake 10 is not completely closed. This process requires only a short period of time and does not generate any significant vehicle deceleration. This measurement is therefore carried out during the trip, in one exemplary arrangement, repeatedly at several points in time.

Figure 3:
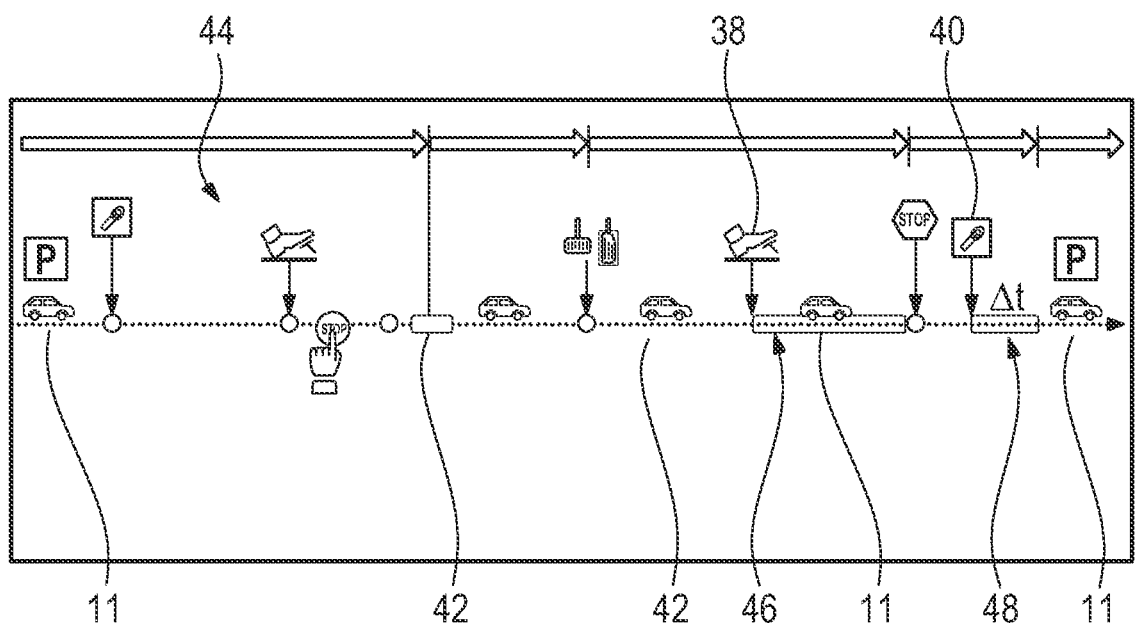
FIG. 3 shows a schematic sequence of a method according to the disclosure in a vehicle brake system according to the disclosure.

For this purpose, a normal braking request 38 is used, for example, in which a braking request for deceleration of the vehicle 11 is implemented (see also FIG. 3).

By way of example, during a normal braking process, the electromechanical service brakes are, for example, initially actuated at only one axle of the vehicle 11 to provide a braking force F to decelerate the vehicle and fulfil the braking request. During a normal braking process, the vehicle speed initially decreases only moderately. During the increase in the braking force F, there is therefore sufficient time to carry out the determination of the current value of the braking contact point 36 at the electromechanical brakes 10 on the axle whose brakes have not yet been actuated.

The determination of the current value of the braking contact point 36 is in each case carried out symmetrically and simultaneously on all brakes 10 of an axle.

If a regenerative function of a drive motor is used to fulfil the braking request (not illustrated), then, for example, the braking force is initially applied by the drive motor alone. As an option, the current values of the braking contact point 36 are determined at all force-sensor-less electromechanical brakes 10 of the vehicle 11 during this phase, if appropriate also at several axles at the same time.

It is possible to determine the current value of the braking contact point 36 during each braking process. However, it is also conceivable to carry out this determination according to some other predetermined scheme.

The force-displacement characteristic of the electromechanical service brake 10 is also determined via the detection element 30. This is accomplished by moving the actuating piston 12 in the direction R until the brake 10 is completely closed, wherein the total rotation angle α of the shaft of the electric motor 28 is measured.

The force-displacement characteristic usually changes only slightly over a single trip of the vehicle. Therefore, the force-displacement characteristic is measured only once per trip, for example. For this purpose, the time period Δt for closing 40 a parking brake of the vehicle 11 is used when parking the vehicle (see FIG. 3).

In order to traverse the force-displacement characteristic, the electric motor 28 is here supplied with a steadily increasing current by a known, unregulated, rising current ramp. At the same time, the time profile of the total rotation angle α of the shaft of the electric motor 28 is measured by the detection element 30. The relationship between the total rotation angle α and the braking force F can be determined as described above. This is used to determine the current profile of the force-displacement characteristic.

Both the braking contact point 36 and the force-displacement characteristic are determined separately for each individual one of the force-sensor-less service brakes 10.

In one exemplary variant, in the time period Δt, all the force-sensor-less electromechanical service brakes 10 of the brake system 43 are moved from the completely open to the completely closed position and the total rotation angle α of the shaft of the electric motor 28 is measured as a function of the supplied current for each of the electromechanical service brakes 10. These data are transferred to the control unit 32, where they are processed in order to determine the current force-displacement characteristics. These are stored in the control unit 32 and are used as a basis for the braking processes of the next trip (see also step 42 in FIG. 3).

This method can also be carried out if at least one of the force-sensor-less electromechanical service brakes 10 itself acts as a parking brake. Since the locking mechanism 34 is not closed until the brake has reached its completely closed state, and this process is not particularly time-critical, the closing of the electromechanical service brake 10 during the determination of the force-displacement characteristic can be used to close the parking brake.

Other force-sensor-less electromechanical service brakes 10 of the vehicle 11 can be measured as described above during the closing of the parking brake.

FIG. 3 shows how, in a brake system 43, the relearning of the braking contact point 36 and the force-displacement characteristics of the force-sensor-less electromechanical service brakes 10 in the vehicle 11 is carried out during the driving operation of the vehicle 11.

From the start of a trip and the starting of the on-board systems of the vehicle 11 (step 44 in FIG. 3), the last stored values for the braking contact point 36 stored in the control unit 32 and the force-displacement characteristics of the electromechanical service brakes 10 are initially used to activate the electromechanical service brakes 10 of the vehicle 11 in order to implement braking requests.

If a suitable braking request 38 is then detected in the subsequent course of the trip, a current value for the braking contact point 36 is determined in the manner described above (see step 46 in FIG. 3). If this step 46 can be carried out without disturbances, an updated value for the braking contact point 36 is available for the subsequent braking processes, possibly already for the current braking process, for at least some of the electromechanical service brakes 10.

In the course of the trip, step 46 can be carried out at multiple different times.

If the vehicle is parked at the end of the trip and a parking brake is closed in step 40, the time period Δt required for this is used in step 48 to determine a current profile of the force-displacement characteristics of one or more electromechanical service brakes 10.

The invention claimed is:

1. A method for operating a force-sensor-less electromechanical service brake of a vehicle, comprising determining a current profile of a force-displacement characteristic of the force-sensor-less electromechanical service brake by measuring a total rotation angle of a shaft of an electric motor while applying a steadily increasing unregulated current and storing during a closing of a parking brake when the vehicle is being parked, wherein the total rotation angle is directly proportional to a relative movement of friction elements of the electromechanical service brake through a rigid force transmission path; storing the determined current profile as a reference for a subsequent trip; and using the stored current profile during the subsequent trip to control the electromechanical service brake based on motor shaft rotation angle to fulfill braking requests without requiring real-time force measurement.

2. The method according to claim 1, wherein the parking brake is one of a force-sensor-less electromechanical service brakes of the vehicle, which force-sensor-less electromechanical service brake comprises a locking mechanism.

3. The method according to claim 1, wherein the current profile of the respective force-displacement characteristic is determined on all the force-sensor-less electromechanical service brakes of the vehicle during the closing of the parking brake.

4. The method according to claim 1, wherein the determination of the current profile of the force-displacement characteristic is carried out only for the electromechanical service brakes configured as parking brakes and the force-displacement characteristics of the other electromechanical service brakes are determined from the determined force-displacement characteristic.

5. The method according to claim 1, wherein, for determining the current profile of the force-displacement characteristic, an electric motor of the electromechanical service brake is activated with a steadily increasing current and a total rotation angle of a shaft of the electric motor is detected, resulting in a time profile of the total rotation angle from which the force-displacement characteristic is determined.

6. The method according to claim 2, wherein the current profile of the respective force-displacement characteristic is determined on all the force-sensor-less electromechanical service brakes of the vehicle during the closing of the parking brake.

7. The method according to claim 2, wherein the determination of the current profile of the force-displacement characteristic is carried out only for the electromechanical service brakes configured as parking brakes and the force-displacement characteristics of the other electromechanical service brakes are determined from the determined force-displacement characteristic.

8. The method according to claim 3, wherein the determination of the current profile of the force-displacement characteristic is carried out only for the electromechanical service brakes configured as parking brakes and the force-displacement characteristics of the other electromechanical service brakes are determined from the determined force-displacement characteristic.

9. The method according to claim 2, wherein, for determining the current profile of the force-displacement characteristic, an electric motor of the electromechanical service brake is activated with a steadily increasing current and a total rotation angle of a shaft of the electric motor is detected, resulting in a time profile of the total rotation angle from which the force-displacement characteristic is determined.

10. The method according to claim 3, wherein, for determining the current profile of the force-displacement characteristic, an electric motor of the electromechanical service brake is activated with a steadily increasing current and a total rotation angle of a shaft of the electric motor is detected, resulting in a time profile of the total rotation angle from which the force-displacement characteristic is determined.

11. The method according to claim 4, wherein, for determining the current profile of the force-displacement characteristic, an electric motor of the electromechanical service brake is activated with a steadily increasing current and a total rotation angle of a shaft of the electric motor is detected, resulting in a time profile of the total rotation angle from which the force-displacement characteristic is determined.

* * * * *